United States Patent
Baer et al.

(10) Patent No.: US 6,558,116 B2
(45) Date of Patent: May 6, 2003

(54) GAS-COOLED MACHINE, IN PARTICULAR A TURBO-GENERATOR

(75) Inventors: Juergen Baer, Maegenwil (CH); Hermann Eichin, Klettgau (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/988,308

(22) Filed: Nov. 19, 2001

(65) Prior Publication Data
US 2002/0127096 A1 Sep. 12, 2002

(30) Foreign Application Priority Data
Nov. 27, 2000 (DE) .......................... 100 58 857

(51) Int. Cl.$^7$ ............................................. F01D 25/12
(52) U.S. Cl. .................. 415/116; 415/175; 415/221; 415/228; 310/58; 310/56
(58) Field of Search ................. 415/175, 176, 415/220, 221, 228, 116; 416/189; 310/56, 58

(56) References Cited

U.S. PATENT DOCUMENTS

| | | | | |
|---|---|---|---|---|
| 3,091,710 A | * | 5/1963 | Shartrand et al. | 310/57 |
| 3,407,317 A | * | 10/1968 | Honsinger | 310/58 |
| 3,725,706 A | * | 4/1973 | Lukens | 310/62 |
| 5,276,373 A | * | 1/1994 | Zimmermann et al. | 310/58 |

FOREIGN PATENT DOCUMENTS

| | | |
|---|---|---|
| AT | 270792 | 5/1969 |
| CH | 554611 | 9/1974 |
| DE | 2 226 157 | 11/1973 |
| DE | 198 56 456 | 6/2000 |
| EP | 0 544 023 | 2/1995 |
| JP | 60-102836 | 6/1985 |
| JP | 08023661 | 1/1996 |

* cited by examiner

Primary Examiner—Ninh Nguyen
(74) Attorney, Agent, or Firm—Burns, Doane, Swecker & Mathis, L.L.P.

(57) ABSTRACT

A turbo-generator comprising a shaft, on which is positioned an axial ventilator, a cover that divides an inflow chamber for a cooling gas transported by the axial ventilator from an outflow chamber for this cooling gas, and a cylindrical channel segment that is positioned coaxially to the axial compressor and surrounds the axial compressor radially, whereby the inflow chamber comprises an asymmetrical cooling gas supply, and whereby in the inflow chamber means for homogenizing the cooling gas supply to the axial ventilator are provided. In order to improve the cooling, and therefore the efficiency of the machine, the inflow chamber forms a rotation-symmetrical annular chamber in the region of an inflow opening of the channel segment. A cylindrical annular collar is positioned coaxially to the axial ventilator within this annular chamber. The annular collar projects axially into the annular chamber and forms a completely surrounding, radial throttling gap at the inflow opening.

14 Claims, 1 Drawing Sheet

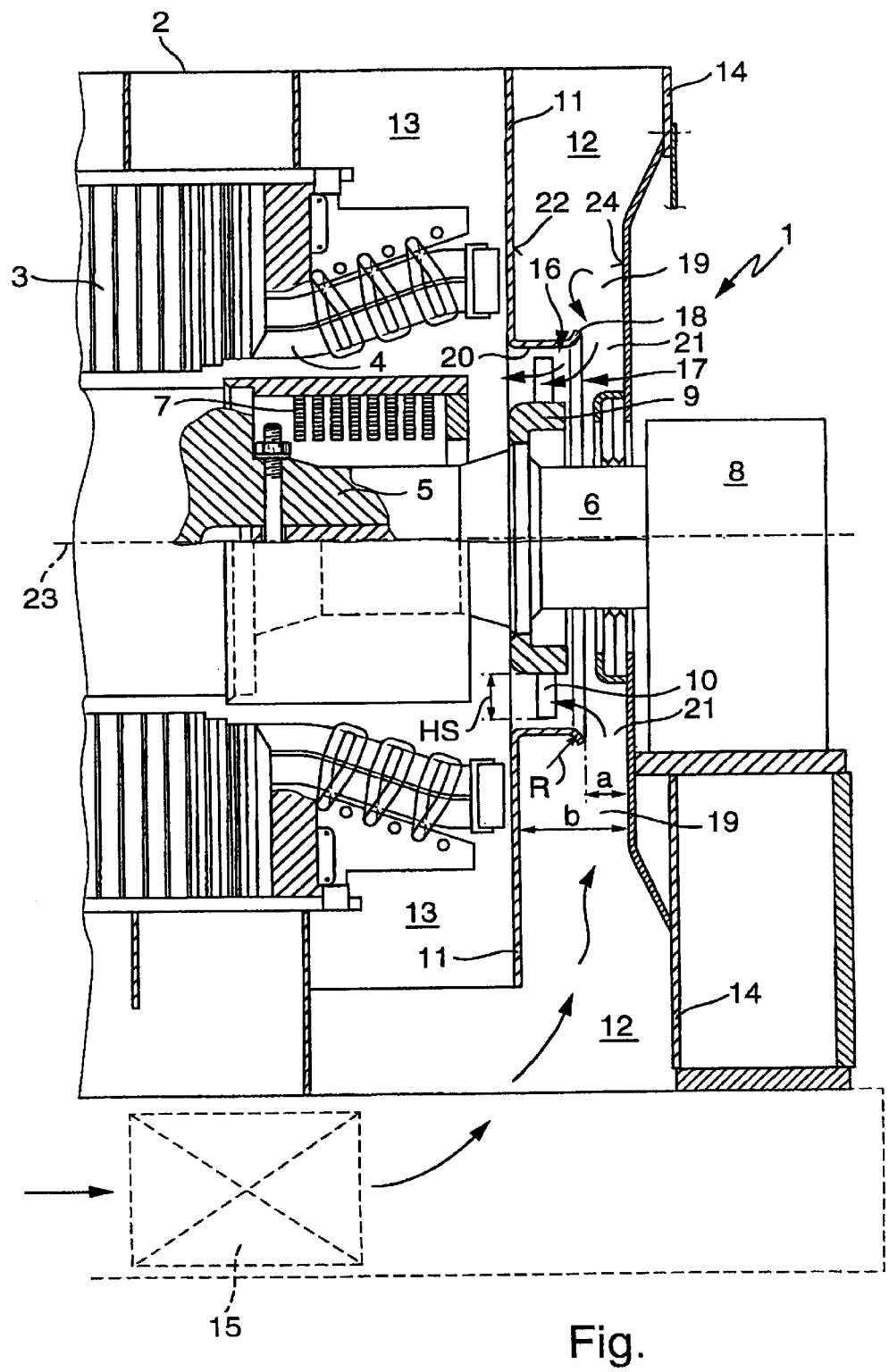
Fig.

the following description.

GAS-COOLED MACHINE, IN PARTICULAR A TURBO-GENERATOR

FIELD OF THE INVENTION

The invention relates to a gas-cooled machine, in particular an electrical machine, for example a turbo-generator.

BACKGROUND OF THE INVENTION

EP 0 544 023 B1 discloses a gas-cooled, electrical machine of this type that comprises a rotatably drivable shaft, on which is positioned an axial ventilator. The known machine also has a cover that divides an inflow chamber from an outflow chamber. In addition, a cylindrical channel section that is positioned coaxially to the axial ventilator and surrounds the latter radially is constructed on this cover. In particular in gas-cooled turbo-generators, a cooling is ensured by means of axial ventilators that usually are attached on both sides of the turbo-generator rotor shaft and provide the required cooling gas amount and a sufficient pressure level. In such turbo-generators, cooling gas guides are constructed in front of and behind the axial ventilator, said cooling gas guides creating in connection with given rotating direction an inflow swirl in the rotating or counter-rotating direction. Because of given installation conditions, the introduction of the cooling gas into the inflow chamber, and thus the flow towards the axial ventilator, usually takes place in turbo-generators only from one side, for example from the bottom, from coolers positioned below the machine. This unilateral, i.e. asymmetrical cooling gas supply and the rotating direction of the axial ventilator causes the blades of the axial ventilator to be subjected in part to a co-swirl and in part to a counter-swirl. Under these conditions, different air speeds occur in the outflow chamber, resulting in an uneven cooling effect. However, poor cooling has a detrimental effect on the utilization of the machine.

In the known machine, the cooling, and therefore the utilization of the machine, is improved in that upstream from the axial ventilator an annular gas guidance element is positioned, which is provided with radially/axially extending guide vanes distributed over its entire circumference. In addition, a cover is provided on a portion of the outer circumference, said cover throttling the flow cross-section for the cooling gas flowing through the gas guidance element in the main direction of the inflow. By means of these guide vanes, the inflow swirl can be reduced, which has a positive effect on the efficiency and therefore on an even pressure generation of the axial ventilator. However, the production and installation of such a gas guidance element is relatively complicated and expensive.

SUMMARY OF THE INVENTION

The present invention relates to the objective of providing a different embodiment for a gas-cooled machine of the initially mentioned type, said embodiment also enabling improved cooling and therefore increased utilization of the machine, and at the same time can be produced at a relatively low cost.

The invention is based on the general idea of realizing a radial throttling gap by way of a special design of the inflow chamber in the area of an inflow opening of the channel segment directly at the inflow opening, which throttling gap extends, in particular rotation-symmetrically, along the entire inflow opening. Since the throttling effect of a throttling point depends on the pressure conditions present, higher inflow speeds are reduced to a greater degree than lower inflow speeds. The pressure conditions and the flow speeds along the throttling gap, and therefore along the inflow opening, are therefore homogenized. Overall, the blades of the axial ventilator therefore can be supplied more evenly with the inflowing cooling gas, so that the cooling effect within the machine, and therefore its utilization, can be improved. This conversion of the asymmetrical cooling gas supply that flows into the inflow chamber to a symmetrical cooling gas flow towards the axial ventilator is achieved with relatively simple constructive means, so that the invention can be realized at a relatively low cost.

In a special embodiment, the annular collar set into the annular chamber can be formed by the channel segment itself or by a portion of the channel segment. This design therefore does not require any additional components that must be installed into the machine in order to realize the machine according to the invention.

It is preferred that an inflow funnel having a curvature radius R that is smaller than the radial length HS of the blades of the axial ventilator is constructed at the inflow opening. It was found to be particularly advantageous if the ratio of R to HS is chosen greater or equal to 0.3. A ratio of R to HS in a range from about 0.3 to about 0.4 is preferred.

Advantages are also realized if an axial length b of the annular chamber, which is formed at least in the region of the inflow opening in the inflow chamber, is at least twice as large as an axial length a of the throttling gap constructed at the inflow opening. A ratio of b to a in a range from about 2.0 to about 4.5 is hereby preferred.

Additional tests also showed that it is advantageous to select the axial length a of the throttling gap smaller than the radial length HS of the blades of the axial ventilator. A ratio of a to HS in a range from about 0.35 to about 1.5 is hereby preferred.

Other important characteristics and advantages of the device according to the invention are found in the secondary claims, the drawing, and related descriptions of the FIGURES in reference to the drawing.

BRIEF DESCRIPTION OF THE DRAWING

The drawing shows a preferred exemplary embodiment of the invention, which is described in more detail in the following description.

The single FIGURE shows a schematic axial section through a part of a machine according to the invention.

DETAILED DESCRIPTION OF THE PREFERRED EMBODIMENTS

According to the only FIGURE, a gas-cooled, electrical machine 1 according to the invention may be formed preferably by a turbo-generator, of which only an end part is shown. A stator 3 of the turbo-generator 1, which is provided in the usual manner with stator windings 4, is positioned in a housing 2. A rotor 5 of the turbo-generator 1 has a shaft 6, on which a rotor winding 7 also is provided in the usual manner. The shaft 6 is positioned at each of its ends in a bearing 8. On this shaft 6, an axial ventilator 9 having axial blades is attached in a non-rotating manner. The radial length of the blades 10 of the axial ventilator 9, i.e. the blade height, is hereby designated with HS. A cover 11, which, in particular, may be constructed in several parts, divides an inflow chamber 12 of the axial ventilator 9 from an outflow chamber 13. The inflow chamber 12 is closed off towards the outside with a corresponding outer cover 14, that also can be constructed in several parts.

A cylindrical channel segment that is positioned coaxially to the axial ventilator 9 and surrounds it radially is constructed on this cover 11. This channel segment 16 has an inflow opening 17 that ends in the inflow chamber 12. An end section of the channel segment 16 that is associated with the inflow opening 17 is constructed as an inflow funnel 18 whose inflow curvature has a curvature radius R. Such a configuration consisting of the cylindrical channel segment 16 and the inflow funnel 18 is called an annular collar 20.

However, another embodiment is possible, in which the annular collar 20 is formed by a separate component that independent from the channel segment 16.

In the embodiment illustrated in the FIGURE, the annular collar 20 projects from a first wall member 22 that is located in a plane extending transversely to the longitudinal axis 23 of the shaft 6, and extends in the direction towards an opposing, second wall member 24 that is also located in a plane extending transversely to the longitudinal axis 23. A throttling gap 21 is formed between the axially free front end of the annular collar 20 and the second wall member 24. Accordingly, in the embodiment illustrated here, the annular collar 20 projects in a direction facing away from the axial ventilator 9 and into an annular chamber 19. In contrast to this, in another embodiment, the annular collar 20 also may originate from the second wall member 24 and extend in the direction of the first wall member 22, whereby the throttling gap 21 then accordingly is formed with the necessary radii between the axially free front end of the annular collar 20 and the first wall member 22. In the last mentioned embodiment, annular collar 20 and channel segment 16 form components that are independent from each other.

The cooling air transported by the axial ventilator 9 from the inflow chamber 12 and deflected by 90° flows in the arrow direction into the outflow chamber 13, is divided there into different partial flows for cooling rotor 5 and stator 3. In a center section of the machine 1 (not shown), the air that has now been heated enters coolers 15 located below the machine 1, is cooled there, and returns to the inflow chamber 12 behind the coolers 15.

It is clear that in such a machine 1, such gas cooling can be realized in principle on both sides. Accordingly, such an axial ventilator 9 with associated inflow chamber 12 and outflow chamber 13 can be provided at both axial end sections of the shaft 6.

As a result of the given installation requirement, the supply of or inflow within the inflow chamber 12 to the axial ventilator 9 takes place essentially only from one side, i.e. from below.

So as to prevent that the unilateral, i.e. asymmetrical introduction of the cooling gas into the inflow chamber 12, and therefore the supply of the axial ventilator 9 in connection with the given rotation direction of the shaft 6 do not result in an uneven cooling of the machine 1, on the one hand the inflow chamber 12 is constructed in the region of the channel segment 16 as a rotationally-symmetrical annular chamber 19 that ensures relatively large flow cross-sections for the inflow to the axial ventilator 9. On the other hand, a cylindrical annular collar 20 is positioned coaxially to the axial ventilator 9 within this annular chamber 19. In the preferred embodiment illustrated here, this annular collar 20 is formed by the channel segment 16 or by an axial portion of this channel segment 16. The channel segment 16 or the annular collar 20 is hereby positioned so that it projects axially into the annular chamber 19 and forms a completely surrounding, rotationally-symmetrical, radial throttling gap 21 at the inflow opening 17. While the throttling gap 21 has an axial length a, the annular chamber 19 has an axial length b.

As a result of the throttling effect of the throttling gap 21, cooling air, which in this example flows in from below, i.e. at a relatively high speed from the inflow chamber 12 towards the axial ventilator 9, is throttled to a greater degree than cooling air that flows in towards the axial ventilator 9 from another point of the inflow chamber 12, for example from the top, after having flown around the annular collar 20, i.e. with a relatively low speed. Because of this effect, a better distribution of the cooling air flowing from the inflow chamber 12 to the axial ventilator 9 is achieved along the throttling gap 21. At the same time, the flow speed of the inflowing cooling air undergoes a homogenization along the circumference in the inflow chamber 12, so that a more even air inlet towards the axial ventilator 9 is able to form overall along the inflow opening 17. The more even supply to the blades 10 of the axial ventilator 9 therefore results in an improvement of the cooling effect for the turbo-generator 1.

The shape and dimensions of the annular chamber 19 and the positioning of the annular collar 20 furthermore causes a kind of calming zone to be formed, in which additionally a calming of the cooling air arriving from the inflow chamber 12 and flowing to the axial ventilator 9 may take place. The annular chamber 19 formed in this way additionally supports the homogenization of the flow through the throttling gap 21.

During testing it was found that the cooling performance, and therefore the utilization of the machine 1, as well as, in particular, the efficiency can be especially increased if the ratio b/a is in a range between about 2.0 and about 4.5, and if the ratio a/HS is in a range between about 0.35 and about 1.5, whereby the ratio R/HS at the same time is in a range from about 0.3 to about 0.4.

What is claimed is:

1. A gas-cooled machine with a rotatably drivable shaft on which is positioned an axial ventilator, having a cover that divides an inflow chamber for a cooling gas transported by the axial ventilator from an outflow chamber for this cooling gas, as well as having a cylindrical channel segment that is positioned coaxially to the axial ventilator and surrounds it radially, whereby the inflow chamber comprises an asymmetrical cooling gas supply, and whereby in the inflow chamber means for homogenizing the cooling gas supply to the axial ventilator are provided, characterized in that the inflow chamber forms at least in the region of an inflow opening of the channel segment a rotation-symmetrical annular chamber, and in the annular chamber, coaxially to the axial ventilator, a cylindrical annular collar is provided, which projects into the annular chamber and forms a completely surrounding, radial throttling gap at the inflow opening.

2. The machine according to claim 1, wherein the throttling gap is constructed rotationally-symmetrical.

3. The machine according to claim 2, wherein the annular chamber has an axial length b, and that the throttling gap has an axial length a, whereby the ratio b/a is greater or equal to 2.0.

4. The machine according to claim 2, wherein the annular chamber has an axial length b, and that the throttling gap has an axial length a, whereby the ratio b/a is in a range from about 2.0 to about 4.5.

5. The machine according to claim 2, wherein the throttling gap has an axial length a that is smaller than the radial length HS of the blades of the axial ventilator.

6. The machine according to claim 5, wherein the ratio a/HS is greater or equal to 0.35.

7. The machine according to claim 5, wherein the ratio a/HS is in a range from about 0.35 to about 1.5.

8. The machine according to claim 1, wherein the annular collar projects into the annular chamber in a direction facing away from the axial ventilator.

9. The machine according to claim 1, wherein the annular collar is formed on the cover.

10. The machine according to claim 1, wherein the channel segment is formed on the cover.

11. The machine according to claim 1, wherein the annular collar is formed by the channels segment or by a portion of the channel segment.

12. The machine according to claim 1, wherein at the inflow opening, an inflow funnel is formed, whose curvature radius R is smaller than the radial length HS of the blades of the axial ventilator.

13. The machine according to claim 12, wherein the ratio R/HS is greater or equal to 0.3.

14. The machine according to claim 12, wherein the ratio R/HS is in a range from about 0.3 to about 0.4.

* * * * *